(12) United States Patent
Vermeer et al.

(10) Patent No.: US 12,550,894 B2
(45) Date of Patent: Feb. 17, 2026

(54) INSECTICIDAL FORMULATION FOR VECTOR AND PEST CONTROL WITH INCREASED CONTACT EFFICACY

(71) Applicant: DISCOVERY PURCHASER CORPORATION, Wilmington, DE (US)

(72) Inventors: Arnoldus Vermeer, Monheim (DE); Peter Hertlein, Leichlingen (DE); Sebastian Horstmann, Leverkusen (DE); Volker Gutsmann, Langenfeld (DE); Alexander Arlt, Cologne (DE); Robert Velten, Langenfeld (DE)

(73) Assignee: DISCOVERY PURCHASER CORPORATION, Wilmington, DE (US)

( * ) Notice: Subject to any disclaimer, the term of this patent is extended or adjusted under 35 U.S.C. 154(b) by 892 days.

(21) Appl. No.: 17/309,740

(22) PCT Filed: Dec. 10, 2019

(86) PCT No.: PCT/EP2019/084352
§ 371 (c)(1),
(2) Date: Jun. 16, 2021

(87) PCT Pub. No.: WO2020/126649
PCT Pub. Date: Jun. 25, 2020

(65) Prior Publication Data
US 2021/0378237 A1 Dec. 9, 2021

(30) Foreign Application Priority Data
Dec. 18, 2018 (EP) .................... 18213622

(51) Int. Cl.
*A01N 25/14* (2006.01)
*A01N 25/04* (2006.01)
*A01N 25/30* (2006.01)
*A01N 53/00* (2006.01)

(52) U.S. Cl.
CPC ............. *A01N 25/14* (2013.01); *A01N 25/04* (2013.01); *A01N 25/30* (2013.01); *A01N 53/00* (2013.01)

(58) Field of Classification Search
CPC ........ A01N 25/14; A01N 25/04; A01N 25/30; A01N 53/00; A01N 25/10; A01N 37/18; A01N 37/22; A01N 37/46; A01N 43/56; A01N 43/80
See application file for complete search history.

(56) References Cited

U.S. PATENT DOCUMENTS

| | | | |
|---|---|---|---|
| 2,285,417 A * | 6/1942 | Corkery | C08L 45/02 526/267 |
| 3,400,093 A | 9/1968 | Feinberg | |
| 9,758,485 B2 | 9/2017 | Hallenbach | |
| 10,150,737 B2 | 12/2018 | Hallenbach | |
| 10,531,660 B2 | 1/2020 | Boecker et al. | |
| 2006/0193882 A1 | 8/2006 | Botts et al. | |
| 2008/0138371 A1 | 6/2008 | Amrhein et al. | |
| 2011/0002998 A1 | 1/2011 | Shaque et al. | |
| 2012/0214857 A1 * | 8/2012 | Reinhard | A01N 25/04 514/407 |
| 2013/0157855 A1 | 6/2013 | Zhang et al. | |
| 2015/0181866 A1 | 7/2015 | Heinemann et al. | |
| 2016/0297765 A1 | 10/2016 | Hallenbach et al. | |

FOREIGN PATENT DOCUMENTS

| | | | | |
|---|---|---|---|---|
| CN | 101170902 A | 4/2008 | | |
| CN | 102638975 A | 8/2012 | | |
| EP | 1900763 A1 | 3/2008 | | |
| JP | 2008532965 A | 8/2008 | | |
| JP | 2016536364 A | 11/2016 | | |
| JP | 2017075144 A | 4/2017 | | |
| JP | 2022513965 A | 2/2022 | | |
| KR | 10-2021-0104794 A | 8/2021 | | |
| TW | 201609639 A | 3/2016 | | |
| WO | WO-0189477 A2 * | 11/2001 | ........... | A61K 9/1635 |
| WO | 2009080464 A2 | 7/2009 | | |
| WO | 2009080487 A2 | 7/2009 | | |
| WO | 2015067646 A1 | 5/2015 | | |
| WO | 2015067647 A1 | 5/2015 | | |
| WO | 2016001285 A1 | 1/2016 | | |
| WO | 2020126648 A1 | 6/2020 | | |

OTHER PUBLICATIONS

Hitachi "DSC Measurements of Polystyrene" Aug. 1995, https://www.hitachihightech.com/file/global/pdf/products/science/appli/ana/thermal/application_TA_068e.pdf (accessed Jul. 15, 2024) (Year: 1995).*
Nakao et al. "Broflanilide: A meta-diamide insecticide with a novel mode of action" Bioorg. Med. Chem. 2016, 24, 372-377 (Year: 2016).*
Noskov et al. "Association in Indene-Coumarone Resins Modified by Phenol" Zhurnal Prikladnoi Spektroskopii, 1968, 8(3), 474-478 (Year: 1968).*
Asahi, M. et al. (2015) "Differential mechanisms of action of the novel γ-aminobutyric acid receptor antagonist ectoparasiticides fluralaner (A1443) and fipronil", Pest Manag Sci, 71:91-95.
Mctier, T. L. et al. (2016). "Discovery of sarolaner: A novel, orally administered, broad-spectrum, isoxazoline ectoparasiticide for dogs," Veterinary Parasitology 222: 3-11.

(Continued)

*Primary Examiner* — Bethany P Barham
*Assistant Examiner* — Judith Marie Kamm
(74) *Attorney, Agent, or Firm* — E. Eric Mills; Nicholas P. Stadnyk; Maynard Nexsen PC

(57) ABSTRACT

Provided herein are insecticidal formulations for vector and pest control with increased contact efficacy, more particularly insecticidal active ingredient-matrix material particles and insecticidal compositions comprising such insecticidal active ingredient-matrix material particles. Methods of preparation of the insecticidal active ingredient-matrix material particles, the insecticidal compositions and uses of such insecticidal formulations are also provided.

21 Claims, No Drawings

(56) References Cited

OTHER PUBLICATIONS

Nakao, T. et al. (2016). "Broflanilide: A meta-diamide insecticide with a novel mode of action," Bioorganic & Medicinal Chemistry 24: 372-377.

Rufener, L. et al. (2017). "The novel isoxazoline ectoparasiticide lotilaner (Credelio™): a non-competitive antagonist specific to invertebrates γ-aminobutyric acid-gated chloride channels (GABACIs)," Parasites & Vectors 10: 530.

Shoop, W.L. et al. (2014). "Discovery and mode of action of afoxolaner, a new isoxazoline parasiticide for dogs," Veterinary Parasitology 201: 179-189.

* cited by examiner

INSECTICIDAL FORMULATION FOR VECTOR AND PEST CONTROL WITH INCREASED CONTACT EFFICACY

CROSS REFERENCE TO RELATED APPLICATIONS

This application is a national stage application under 35 U.S.C. § 371 of International Application No. PCT/EP2019/084352, filed internationally on Dec. 10, 2019, which claims priority benefit of European Application No. 18213622.6, filed Dec. 18, 2018.

BACKGROUND OF THE INVENTION

The use of pesticides to protect fruits, vegetables and other agricultural crops against insects is well established. Next to these applications the same type of active ingredients can be used to protect people against vector transmitting insects such as e.g. mosquitos (vector control) and insects e.g. such as cockroaches, flies and bed bugs that are described as hygiene pests outside the agricultural environment.

To protect people against these insects, surfaces in and around the living & food production environment of the people are treated with an insecticide. Since contact times are often only short a relative fast uptake of the insecticide is required. In contrast to many agricultural applications the mechanism for control for the active ingredient in these types of applications is restricted to contact efficacy. No oral uptake will take place when for example mosquitos land and walk on treated surfaces. Consequently, only limited types of pesticides are effective for these treatments. Examples are pyrethroids, carbamates, organophosphates and DDT. Evidently, the latter three are not preferred because of their toxicological profile for human beings and the environment. Pyrethroids on the other hand have been used in vector control and professional pest management very extensively over the last decades with the result that strong resistance against this mode of action is establishing.

Some other insecticidal active ingredients show efficacy and even resistance breaking potential for vector control and professional pest management relevant pests. However, because of their physicochemical properties they show only limited contact efficacy. The high melting point and molecular weight of such insecticidal active ingredients entail that they have a tendency to form highly crystalline structures that are poorly soluble. Consequently, the uptake in the insect via contact is very limited and the insects cannot be efficiently treated with known formulations such as e.g. a conventional suspension concentrate formulation in which the insecticidal active ingredient is present as a crystalline entity.

The use of polymers and/or waxes as matrix material, on the other hand, is known in agricultural formulations. Many "controlled release" formulations are based on this principle and have been described in the literature. US20060193882A, for example, discusses a formulation where an agrochemical active ingredient is included in a polymer matrix in order to prolong the residual biological efficacy. However, with this measure the initial biological efficacy is reduced. Low initial biological efficacy goes along with low contact efficacy and therefore, such "controlled release" formulations are in general not useful for the purpose to increase the contact efficacy of an insecticidal active ingredient whenever only short contact times occur.

DESCRIPTION OF THE INVENTION

The purpose of the present invention was therefore to provide technical formulation means to solve the issues identified in the prior art and in particular to exploit the full contact and initial (fast knock-down after contact) biological efficacy potential of insecticidal active ingredients with challenging physicochemical properties. A particular purpose was to provide technical formulation means for insecticidal active ingredients that have high tendency to crystallize under normal conditions but that generally have a higher biological activity against pests in the amorphous state. A further purpose was to provide technical formulation means for pest control, in particular cockroaches, mosquitos, flies, bed bugs etc., with high biological contact efficacy on various surfaces such as e.g. flat, porous or muddy surfaces. Another purpose was to provide technical formulations means for pest control with a resistance breaking potential, in particular with pyrethorid resistance breaking potential.

It has now been found that the purpose has been addressed and a solution is provided with the insecticidal active ingredient-matrix particles as further described hereinafter.

The insecticidal active ingredient-matrix particles of the invention relate to insecticidal active ingredient-matrix particles with a particle size d50 of 0.1 to 75 microns comprising a) at least one insecticidal active ingredient with a melting point of equal or above 110° C. and a water solubility of equal or below 0.1% and wherein at least one insecticidal active ingredient is distributed in b) a matrix material comprising polymerized monomer units selected from the group of C7 to C12 unsaturated aromatic hydrocarbons.

The insecticidal active ingredient-matrix particles of the invention have preferably a particle size of between 0.1 to 75 microns and more preferably between 0.5 and 50 microns and even more preferably between 1 and 25 microns. The D50 value is preferably determined by laser diffraction after dispersion of the insecticidal active ingredient-matrix particles of the invention in a water phase.

The insecticidal active ingredient-matrix particles of the invention comprise at least one insecticidal active ingredient with a melting point of equal or above 110° C., preferably equal or above 120° C., more preferably equal or above 130° C. and even more preferably equal or above 140° C. and even more preferably equal or above 150° C.; and a water solubility of equal or below 0.1%, preferably equal or below 0.01%, more preferably equal or below 0.005% and even more preferred equal or below 0.001%. In another preferred embodiment of the invention the insecticidal active ingredient-matrix particles comprise one insecticidal active ingredient with the above indicated physicochemical properties. The melting points according to the invention are measured under standard conditions (1 atmosphere). Water solubility are indicated in percentage referring to the quotient of (g) gram insecticidal active ingredient/100 ml water. Water solubility is preferably measured with liquid chromatography e.g. with a HPLC-MS system (at 20° C., 1 atmosphere and pH 7, see also example 1 as a reference).

According to a preferred embodiment of the invention, the "at least one" insecticidal active ingredient of the invention comprises at least one amide chemical moiety.

More preferably the at least one insecticidal active ingredient of the invention is selected from the chemical classes of isoxazolines, meta-diamides, arylpyrazolheteroarylamides and arylpyrazolarylamides and/or is active on the γ-aminobutyric acid (GABA) receptor.

The isoxazolines are a class of compounds, which are active against arthropods and insects relevant in the field of plant protection as well as ectoparasites on animals. They are antagonists of the γ-aminobutyric acid (GABA) receptor. The binding site of the isoxazolines is at least partly different from the ones of the cyclodienes and fipronil. (W. L. Shoop et al. Veterinary Parasitology 2014, 201, 179-189; T. L. McTier et al. Veterinary Parasitology 2016, 222, 3-11; K. Nakahira et al. Pest Management Science 2015, 71, 91-95; L. Rufener et al. Parasites & Vectors 2017, 10, 530. Prominent representatives of this class are e.g. lotilaner, sarolaner, fluralander, afoxolaner and 4-[5S]-5-(3,5-dichloro-4-fluorophenyl)-5-(trifluoromethyl)-4,5-dihydro-1,2-oxazol-3-yl]-N-[(4R)-2-ethyl-3-oxo-1,2-oxazolidin-4-yl]-2-methylbenzamide (CAS 1309959-62-3).

The meta-diamides are a class of compound which act as antagonist on the γ-aminobutyric acid (GABA) receptor. A prominent representative of this class is broflanilide. The binding site of desmethyl-broflanilide is at least partly different from the ones of the cyclodienes and fipronil (T. Nakao, S. Banba Bioorganic & Medicinal Chemistry 2016, 24, 372-377).

The class of arylpyrazolheteroarylamides and arylpyrazolarylamides that can be preferably used in connection with the present invention are described in WO 2015/067647A1 and WO 2015/067646A1, which are herewith incorporated by reference. Preferably this class relates to 2-chloro-N-cyclopropyl-5-{1-[2,6-dichloro-4-(1,1,1,2,3,3,3-heptafluoropropan-2-yl)phenyl]-1H-pyrazol-4-yl}-N-methylnicotinamide.

In this context, the term "active on the GABA receptor" relates preferably to the characteristic of a chemical molecule to modulate the GABA receptors physiological activity.

The insecticidal active ingredients according to the invention may be, depending on the active ingredient, in the form of geometric and/or optically active isomers or corresponding isomer mixtures in different compositions. These stereoisomers are, for example, enantiomers, diastereomers or geometric isomers. Accordingly, the invention encompasses the use of both pure stereoisomers and any mixture of these isomers.

Even more preferably, the at least one insecticidal active ingredient of the invention is selected from the group of:
2-chloro-N-cyclopropyl-5-{1-[2,6-dichloro-4-(1,1,1,2,3,3,3-heptafluoropropan-2-yl)phenyl]-1H-pyrazol-4-yl}-N-methylnicotinamide (CAS 1771741-86-6),
broflanilide: 3-[benzoyl(methyl)amino]-N-[2-bromo-4-(1,1,1,2,3,3,3-heptafluoropropan-2-yl)-6-(trifluoromethyl)phenyl]-2-fluorobenzamide (CAS 1207727-04-5),
4-[(5S)-5-(3,5-dichloro-4-fluorophenyl)-5-(trifluoromethyl)-4,5-dihydro-1,2-oxazol-3-yl]-N-[(4R)-2-ethyl-3-oxo-1,2-oxazolidin-4-yl]-2-methylbenzamide (CAS 1309959-62-3),
4-[(5R)-5-(3,5-dichloro-4-fluorophenyl)-5-(trifluoromethyl)-4,5-dihydro-1,2-oxazol-3-yl]-N-[(4S)-2-ethyl-3-oxo-1,2-oxazolidin-4-yl]-2-methylbenzamide (CAS 2061933-86-4),
4-[(5S)-5-(3,5-dichloro-4-fluorophenyl)-5-(trifluoromethyl)-4,5-dihydro-1,2-oxazol-3-yl]-N-[(4S)-2-ethyl-3-oxo-1,2-oxazolidin-4-yl]-2-methylbenzamide (CAS 1429660-18-3),
4-[(5R)-5-(3,5-dichloro-4-fluorophenyl)-5-(trifluoromethyl)-4,5-dihydro-1,2-oxazol-3-yl]-N-[(4R)-2-ethyl-3-oxo-1,2-oxazolidin-4-yl]-2-methylbenzamide (CAS 1309958-03-9),
sarolaner: 1-[6-[(5S)-5-(3,5-dichloro-4-fluorophenyl)-5-(trifluoromethyl)-4H-1,2-oxazol-3-yl]spiro[1H-2-benzofuran-3,3'-azetidine]-1'-yl]-2-methylsulfonylethanone (CAS 1398609-39-6),
fluralaner: 4-[5-(3,5-dichlorophenyl)-5-(trifluoromethyl)-4H-1,2-oxazol-3-yl]-2-methyl-N-[2-oxo-2-(2,2,2-trifluoroethylamino)ethyl]benzamide (CAS 864731-61-3),
lotilaner: 3-methyl-N-[2-oxo-2-(2,2,2-trifluoroethylamino)ethyl]-5-[(5S)-5-(3,4,5-trichlorophenyl)-5-(trifluoromethyl)-4H-1,2-oxazol-3-yl]thiophene-2-carboxamide (CAS 1369852-71-0),
afoxolaner: 4-[5-[3-chloro-5-(trifluoromethyl)phenyl]-5-(trifluoromethyl)-4H-1,2-oxazol-3-yl]-N-[2-oxo-2-(2,2,2-trifluoroethylamino)ethyl]naphthalene-1-carboxamide (CAS 1093861-60-9), Even more preferably, the "at least one" insecticidal active ingredient of the invention is selected from the group of:
2-chloro-N-cyclopropyl-5-{1-[2,6-dichloro-4-(1,1,1,2,3,3,3-heptafluoropropan-2-yl)phenyl]-1H-pyrazol-4-yl}-N-methylnicotinamide (CAS 1771741-86-6),
broflanilide: 3-[benzoyl(methyl)amino]-N-[2-bromo-4-(1,1,1,2,3,3,3-heptafluoropropan-2-yl)-6-(trifluoromethyl)phenyl]-2-fluorobenzamide (CAS 1207727-04-5),
4-[(5S)-5-(3,5-dichloro-4-fluorophenyl)-5-(trifluoromethyl)-4,5-dihydro-1,2-oxazol-3-yl]-N-[(4R)-2-ethyl-3-oxo-1,2-oxazolidin-4-yl]-2-methylbenzamide (CAS 1309959-62-3).

Most preferably, the "at least one" insecticidal active ingredient of the invention is selected from the group of 2-chloro-N-cyclopropyl-5-{1-[2,6-dichloro-4-(1,1,1,2,3,3,3-heptafluoropropan-2-yl)phenyl]-1H-pyrazol-4-yl}-N-methylnicotinamide (CAS 1771741-86-6) and broflanilide and even more preferably the "at least one" insecticidal active ingredient is 2-chloro-N-cyclopropyl-5-{1[2,6-dichloro-4-(1,1,1,2,3,3,3-heptafluoropropan-2-yl)phenyl]-1H-pyrazol-4-yl}-N-methylnicotinamide (CAS 1771741-86-6).

In a further embodiment, the insecticidal active ingredient-matrix particles of the invention comprise at least one of the above described insecticidal active ingredient distributed and preferably evenly distributed in a matrix material as herein described. The distribution is preferably achieved with a heating step wherein at least one insecticidal active ingredient and the matrix material are heated at a temperature where the matrix material is no longer solid, preferably above the softening point of the matrix material but below the melting point of the insecticidal active ingredient. The mixture is kept at this temperature (such as e.g. for a time period of 10, 15 or 20 minutes) until the described insecticidal active ingredient is evenly distributed. The particle size of the insecticidal active ingredient-matrix particles can be obtained afterwards by conventional milling and/or grinding means with customary mixers, mills and/or grinders.

The matrix material as used for insecticidal active ingredient-matrix particles of the invention comprise polymerized monomer units selected from the group of C7 to C12 unsaturated aromatic hydrocarbons preferably with a softening point of between 80° C. and 130° C. and more preferably with a softening point of between 80° C. and 115° C. and even more preferred of between 80° C. and 110° C. The term "softening point" as used herein is referring to the Vicat softening temperature or Vicat hardness and is the determination of the softening point for materials that have no definite melting point, such as resins. It is taken as the temperature at which the specimen is penetrated to a depth of 1 mm by a flat-ended needle with a 1 mm² circular or square cross-section. Preferably the Vicat B120 test is used to measure the softening point. The Vicat B120 test is characterized by a load of 50 N and a heating rate of 120 (K/h). Standards to determine Vicat softening point include ASTM D 1525 and ISO 306, which are largely equivalent.

In a further preferred embodiment of the invention, the matrix material comprises polymerized monomer units selected from the group of C8 to C11 and even more preferred selected from the group of C9 to C10 unsaturated aromatic hydrocarbons. In this context C7 to C12 resp. C8 to C11, resp. C9 to C10 refers to the amount of carbon atoms that are present within the molecules. In another particular preferred embodiment of the invention, the monomer units are selected from the group of indene, methyl indene, vinyltoluene, alpha-methylstyrene, styrene and/or dicyclopentadien. In an even more preferred embodiment the monomer units are selected from the group of indene and methyl indene.

An especially preferred matrix material is a product from the Novares AS, TK, TL, TN, TC, C and CA series from the company Rütgers with a softening point of between 80 and 115° C. Even more preferred are Novares Pure 85 AS (Rütgers Group), Novares C 100 (Rütgers Group), Novares TL 100 (Rütgers Group), Novares TK 100 (Rütgers Group), Novares TN 100 (Rütgers Group) matrix materials.

The polymerization of the monomer units has e.g. been described in EP1900763 A1 and is in general known to a person skilled in the art. In a preferred embodiment the polymerization is a cationic polymerization, wherein the weight ratio between the monomer units can vary from matrix material to matrix material. An appropriate matrix material can also be polymerized from one particular monomer unit alone such as e.g. indene (e.g. the Novares C series from Rütgers). Furthermore, the polarity of such a matrix material can be increased by modification with phenol (e.g. the Novares CA series from Rütgers; a phenol modified indene matrix material).

Another embodiment of the invention refers to an insecticidal active ingredient-matrix material particle with the above indicated particle size comprising
 a) at least one insecticidal active ingredient with a melting point of equal or above 110° C. and a water solubility of equal or below 0.1% and wherein at least one insecticidal active ingredient is distributed in
 b) a matrix material, preferably wherein the matrix material has a softening point that is at least 30° C. under the melting point of the at least one insecticidal active ingredient,
characterized in that the insecticidal active ingredient-matrix material particle does not exhibit a melting peak of the active ingredient when measured in a second heating cycle after heating to a temperature of at least 20° C. above the melting point of the at least one insecticidal active ingredient at a steady heating rate of preferably between 5 to 15° C. per minute and more preferably at 10° C. per minute using Differential Scanning Calorimetry.

In this connection a "matrix material", wherein the matrix material has preferably a softening point that is at least 30° C. under the melting point of the at least one insecticidal active ingredient is preferably selected from a matrix material such as a hydrocarbon resin, more preferably an unsaturated aromatic hydrocarbon resin and even more preferred a C8 to C12 unsaturated aromatic hydrocarbon resin. Such a preferred resin comprise polymerized monomer units selected from C8 to C12 unsaturated aromatic hydrocarbons. An even more preferred matrix material is further described above.

A further embodiment of the invention relates to an insecticidal active ingredient-matrix material particle as outlined above, characterized in that in the first heating cycle of a Differential Scanning Calorimetry the "at least one" insecticidal active ingredient and the matrix material are heated to a temperature of at least 20° C., preferably at least 20° C. but not more than 50° C., above the melting point of the at least one insecticidal active ingredient at a steady heating rate of preferably between 5° to 15° C. per minute and more preferably at 10° C. per minute.

In a preferred version of the Differential Scanning Calorimetry as described above the maximal heating temperature of the first heating cycle is retained for a period of at least 10 minutes, preferably 15 minutes, more preferably 20 minutes.

In another preferred embodiment of the invention the at least one insecticidal active ingredient and the matrix material are cooled down to a temperature of between 0° C. to 40° C., preferably of between 15° C. to 35° C., more preferably of between 20° C. to 30° C. between the first and second heating cycle of the Differential Scanning Calorimetry and preferably also after the second heating cycle each at a steady cooling rate of preferably between 5° C. to 15° C. per minute and more preferably 10° C. per minute.

The term "steady heating rate" as used herein refers to a certain temperature increase per minute which is kept constant. The temperature increase over time is therefore preferably linear.

Analogously, the term "steady cooling rate" as used herein refers to a certain temperature decrease per minute which is kept constant. The temperature decrease over time is therefore preferably linear.

The term "melting peak" as used herein preferably refers to an endothermic signal in the Differential Scanning Calorimetry (DSC) thermogram. The basic principle underlying this technique is that when the sample undergoes a physical transformation such as phase transitions, more or less heat will need to flow to it than the reference to maintain both at the same temperature. Whether less or more heat must flow to the sample depends on whether the process is exothermic or endothermic. For example, as a solid sample melts to a liquid, it will require more heat flowing to the sample to increase its temperature at the same rate as the reference. This is due to the absorption of heat by the sample as it undergoes the endothermic phase transition from solid to liquid.

A preferred embodiment of the invention relates to an insecticidal active ingredient-matrix material particle as outlined above, characterized in that in the first heating cycle of a Differential Scanning Calorimetry the at least one insecticidal active ingredient and the matrix material are heated to a temperature of at least 10° C. above the softening point of the matrix material and at least 20° C. below the melting point of the at least one insecticidal active ingredient at a steady heating rate of preferably between 5° to 15° C. per minute and more preferably at 10° C. per minute.

Since the tiles used in a DSC experiment are small and convection/stirring cannot be applied for an adequate mixing of the components (matrix material and insecticidal active ingredient) the mixing is only kinetically controlled. This might result in a false negative result when searching for a compatible matrix material. In the case that such a mixing does not occur spontaneously at a temperature of at least 10° C. above the softening point of the matrix material and at least 20° C. below the melting point of the at least one insecticidal active ingredient, longer waiting times shall be applied (the maximal heating temperature of the first heating cycle is then preferably retained for a period of at least 30 minutes, more preferably 60 minutes, even more preferably 120 minutes) or alternatively, the first heating cycle is adapted by heating to a temperature of at least 20° C. above the melting point of the insecticidal active ingredient to assure an even distribution. An effective method to determine if the mixing in the tiles does not occur spontaneously, or whether the matrix material is not suitable, uses the melting enthalpy of the insecticidal active ingredient. By comparison of the melting enthalpy of the isolated insecticidal active ingredient with that of a possible peak which occurs during the second heating cycle, the fraction of insecticidal active ingredient that is dissolved can be determined. In the case that only part of the insecticidal active substance is dissolved, it is preferred that the first heating cycle of the DSC is adapted by heating to a temperature of at least 20° C. above the melting point of the insecticidal active ingredient in order to determine whether the matrix material is suitable.

Another embodiment of the invention relates to an insecticidal active ingredient-matrix material particle as described herein characterized in that the weight ratio between the at least one insecticidal active ingredient and the matrix material is from 1:99 to 1:1, preferably between 5:95 to 40:60.

The concentration of the insecticidal active ingredient in the insecticidal active ingredient-matrix material particle respectively in the resulting insecticidal compositions depends on the required dose rate of the insecticidal active ingredient/square meter treated surface. However, such products are typically sprayed with a 10 liter back pack sprayer with which 250 m² surface can be treated. For such a 10 liter back pack sprayer solution 25 to 250 gram of formulated product preferably 50 to 150 gram of formulated product are used.

The insecticidal active ingredient concentration per square meter is usually in the range of 1 to 500 mg/m² and more preferably in the range of 2 to 200 mg/m².

The molecular weight of the matrix material according to the invention can vary but is preferably between 1 to 1000 kDa.

A further embodiment of the invention relates to an insecticidal composition, wherein the insecticidal composition comprises
  a) an insecticidal active ingredient-matrix material particle as described herein, preferably from 1 to 70% by weight, more preferably from 5 to 60% by weight and even more particularly from 10 to 50% by weight,
  b) at least one surfactant(s), preferably at least one nonionic surfactant and/or at least one anionic surfactant, preferably the surfactant(s) are present from 1 to 25% by weight and more preferably from 2 to 25% by weight and even more preferably 2.5 to 15% by weight,
  c) optionally further adjuvants selected from the group of anti-freeze agents, anti-foam agents, preservatives, anti-oxidants, thickeners, colourants and binders, preferably from 0 to 25% by weight, more preferably from 0.1 to 20% by weight, and even more preferably from 0.5 to 10% by weight;
  d) a liquid phase and/or fillers (which in any case add up to 100% per weight of the total insecticidal composition).

Suitable anionic surfactants are all substances of this type which can usually be employed in agrochemical compositions. As examples are named: alkali metal salts of condensation products of a fatty acid chloride and an aminosulfonic acid, alkali metal salts of fatty alkyl and alkenyl sulfonates and sulfates wherein fatty alkyl and alkenyl includes alkyl and alkenyl groups of from about 8 to 18 carbons, alkali metal alkylbenzene sulfonates having at least 10 carbons in the alkyl group thereof. Preferred members of this class include those having from 10 to about 18 carbons in the alkyl group, ethoxylated alkyl phenols having from about 8 to about 15, preferably from about 8 to about 10, carbons in the alkyl group and about 4 to about 20 oxyethylene units.

Even more preferred anionic surfactants are selected from the group of alkali metal and alkaline earth metal salts of alkylsulphonic acids or alkylarylsulphonic acids. Further even more preferred anionic surfactants are salts of polystyrenesulphonic acids, salts of polyvinylsulphonic acids, salts of naphthalenesulphonic acid/formaldehyde condensates, salts of condensates of naphthalenesulphonic acid, phenolsulphonic acid and formaldehyde and also salts of lignosulphonic acid.

Suitable nonionic surfactants are all compounds of this type which can usually be employed in agrochemical compositions. As examples are named: polyethylene oxide/polypropylene oxide block copolymers, polyethylene glycol ethers of straight-chain alcohols, reaction products of fatty acids with ethylene oxide and/or propylene oxide, furthermore polyvinyl alcohol, polyvinylpyrrolidone, mixed polymers of polyvinyl alcohol and polyvinylpyrrolidone, mixed polymers of polyvinyl acetate and polyvinylpyrrolidone and also copolymers of (meth)acrylic acid and (meth)acrylic esters, furthermore alkyl ethoxylates and alkylaryl ethoxylates which may optionally be phosphated and may optionally be neutralized with bases, polyoxyamine derivatives and nonylphenol ethoxylates are preferred.

Suitable anti-freeze agents for the insecticidal composition of the invention are all those substances which are usually employed for this purpose in agrochemical compositions. Preference is given to urea, glycerol and propylene glycol.

Suitable anti-foam agents for the insecticidal composition of the invention are all those substances which are usually employed for this purpose in agrochemical compositions. Preference is given to silicone oils and magnesium stearate.

Suitable preservatives for the insecticidal composition of the invention are all those substances of this type which are usually employed for this purpose in agrochemical compositions. Examples are Preventol® (from Bayer AG) and Proxel®.

Suitable anti-oxidants for the insecticidal composition of the invention are all those substances which are usually employed for this purpose in agrochemical compositions. Preference is given to butylated hydroxytoluene (2,6 di-t-butyl 4-methylphenol, BHT).

Suitable thickeners for the insecticidal composition of the invention thickeners are all those substances of this type which are usually employed in agrochemical compositions. Preference is given to silicates (such as, for example, Attagel® 50 from Engelhard) or xanthan gum (such as, for example, Kelzan® S from Kelko).

Suitable colourants for the insecticidal composition of the invention are all those substances which are usually employed for this purpose in agrochemical compositions. Examples are titanium dioxide, carbon black, zinc oxide and blue pigments and permanent red FGR.

Suitable fillers are all those substances which are usually employed for this purpose in agrochemical compositions. Preference is given to inert fillers such as inorganic particles or salts, such as carbonates, silicates and oxides, and also organic substances, such as urea/formaldehyde condensates. Further examples are ulmer white, etiquette violette chalk, potassium sulfate, diammonium hydrogen phosphate, kaolin, rutile, silicon dioxide, what is known as highly disperse silica, silica gels, and also natural and synthetic silicates such as montmorillonite, bentonite and chemically modifier versions of these clays, furthermore talc. Preferred inert fillers are carbonates such as ulmer white, etiquette violette chalk, silicates such as kaolin, and salts such as potassium sulfate.

Suitable binders for the insecticidal composition of the invention are all those substances which are usually employed for this purpose in agrochemical compositions. Examples are polyvinylpyrrolidone, such as Sokalan K 30 or Sokalan K 90.

Preferred insecticidal compositions are in the form of a suspension concentrate (SC), water-dispersable granule (WG) or wettable powder (WP) or a spray solution thereof.

In general, it has been surprisingly found that the insecticidal compositions according to the invention remain stable even after prolonged storage (2 weeks) at elevated temperatures (54° C.) or in the cold and no crystal growth has been observed. By dilution with water, SC, WG or WPs can be converted into homogeneous spray solutions.

For a suspension concentrate (SC) formulation e.g. a liquid phase is necessary which is preferably water.

For an SC formulation based on the insecticidal active ingredient-matrix material particles of the invention, the insecticidal composition does preferably comprise one or more surfactant(s), preferably from 2 to 20% by weight, more preferably 2.5 to 10% by weight.

For an SC formulation, the insecticidal composition does preferably comprise (as feature (c)) adjuvants selected from the groups of anti-freeze agents, anti-foam agents, preservatives, anti-oxidants and thickeners, preferably from 0.1 to 20% by weight.

The SC formulation according to the invention are prepared by mixing the particular desired ratios of the components with one another. The components may be mixed with one another in any order; if a thickener is present it is preferably added after the milling process. Expediently, the solid components are employed in a fine ground state. However, it is also possible to subject the suspension formed after mixing of the components initially to a coarse grinding then to a fine grinding to achieve the particle size d50 of the insecticidal active ingredient-matrix material particles and the same d50 for the other components. The SC formulation has therefore a particle size d50 of all components of 0.1 to 75 microns, more preferably between 0.5 and 50 microns and even more preferably between 1 and 25 microns. Suitable for carrying out the preparation of an SC are customary mixers, mills and grinders employed for producing agrochemical formulations.

When preparing the SC formulation the temperatures may be varied within a certain range. In general, the process is carried out at temperatures between 10° C. and 60° C., preferably between 15° C. and 45° C. and under normal pressure.

For a wettable powder (WP) formulation fillers are necessary.

For a WP formulation, the insecticidal composition does preferably comprise as one or more surfactant(s) (as feature (b)), preferably from 2 to 25% by weight, more preferably 2.5 to 15% by weight.

For a WP formulation, the insecticidal composition does preferably comprise (as feature (c)) adjuvants selected from the groups of anti-foam agents, preservatives, anti-oxidants, preferably from 0.5 to 10% by weight. The WP formulation according to the invention are prepared by mixing the particular desired ratios of the components with one another. The components may be mixed with one another in any order. Expediently, the solid components are employed in a fine ground state. However, it is also possible to subject the suspension formed after mixing of the components initially to a coarse grinding then to a fine grinding to achieve the particle size d50 of all components of 0.1 to 75 microns, preferably 0.5 and 50 microns and even more preferably between 1 and 25 microns.

Suitable for carrying out the process according to the invention are customary mixers and dry milling devices such as an air yet mill employed for producing agrochemical formulations.

The water-dispersible granule (WG) formulation according to the invention can, for example, be prepared as extrusion granule, fluid bet granule or spray drying granule according to standard methods as applicable in the agrochemical industry. Commonly, the basis for an extrusion granule is a WP type of premix (TK), for the other technologies the basis is a suspension concentrate (slurry). In addition to the described compositions these TK and slurry can have as further components the herein described fillers and/or binders.

For a WG formulation, the insecticidal composition does preferably comprise as one or more surfactant(s) (feature (b)), preferably from 2 to 25% by weight, more preferably 2.5 to 15% by weight.

For a WG formulation, the insecticidal composition does preferably comprise (as feature (c)) adjuvants selected from the groups of anti-foam agents, preservatives, anti-oxidants, binders, preferably from 0.5 to 10% by weight.

For a WG formulation, the insecticidal composition does preferably comprise (as feature (d)) fillers (which in any case add up to 100% per weight of the total WG formulation).

Another embodiment of the invention relates to the us of an insecticidal active ingredient-matrix material particle as described herein or an insecticidal composition as described herein to control pests in particular insects and/or arachnids (preferably of the subclass Acari), and especially mosquitoes, flies, mites, ticks, lice, ants, termites and cockroaches.

The pests are preferably controlled via contact of the pest with the insecticidal active ingredient-matrix material particle as described herein or an insecticidal composition as described herein. Preferably no oral uptake is required. The term "control" of the pests refers to the possibility to be able to knock-down, kill and/or repel the pests.

The insecticidal active ingredient-matrix material particle as described herein or an insecticidal composition as described herein are preferably used outside the agricultural environment and in particular for vector control and professional pest management applications.

For the purpose of the present invention, a vector is an arthropod, in particular an insect or arachnid, capable of transmitting pathogens such as, for example, viruses, worms, single-cell organisms and bacteria from a reservoir (plant, animal, human, etc.) to a host. The pathogens can be transmitted either mechanically (for example trachoma by non-stinging flies) to a host, or by injection (for example malaria parasites by mosquitoes) into a host.

Examples of vectors and the diseases or pathogens they transmit are:

1) Mosquitoes: Anopheles: malaria, filariasis; Culex: Japanese encephalitis, other viral diseases, filariasis, transmission of other worms; Aedes: yellow fever, dengue fever, other viral diseases, filariasis; Simuliidae: transmission of worms, in particular Onchocerca volvulus; Psychodidae: transmission of leishmaniasis 2) Lice: skin infections, epidemic typhus;
3) Fleas: plague, endemic typhus, cestodes;
4) Flies: sleeping sickness (trypanosomiasis); cholera, other bacterial diseases;
5) Mites: acariosis, epidemic typhus, rickettsialpox, tularaemia, Saint Louis encephalitis, tick-borne encephalitis (TBE), Crimean-Congo haemorrhagic fever, borreliosis;
6) Ticks: borellioses such as Borrelia burgdorferi sensu lato., Borrelia duttoni, tick-borne encephalitis, Q fever (Coxiella burnetii), babesioses (Babesia canis canis), ehrlichiosis.

Examples of vectors in the sense of the present invention are insects, for example aphids, flies, leafhoppers or thrips, which are capable of transmitting plant viruses to plants. Other vectors capable of transmitting plant viruses are spider mites, lice, beetles and nematodes.

Further preferred examples of vectors in the sense of the present invention are insects and arachnids such as mosquitoes, in particular of the genera Aedes, Anopheles, for example A. gambiae, A. arabiensis, A. funestus, A. dirus (malaria) and Culex, psychodids such as Phlebotomus, Lutzomyia, lice, fleas, flies, mites and ticks capable of transmitting pathogens to animals and/or humans.

The insecticidal active ingredient-matrix material particle as described herein or an insecticidal composition as described herein are suitable for use in the prevention of diseases and/or pathogens transmitted by vectors. Thus, a further aspect of the present invention is the use of active compound combinations according to the invention for vector control, for example in agriculture, in horticulture, in gardens and in leisure facilities, and also in the protection of materials and stored products.

Furthermore, the insecticidal active ingredient-matrix material particle as described herein or an insecticidal composition as described herein are suitable for professional pest management applications against common pests occurring in household situation and public/commercial premises such as cockroaches, mosquitoes, ants, mites, flies, stored product pests, occasional pests, termites etc.

Professional pest management is conducted to reduce pest numbers to an acceptable level by use of various strategies.

Examples of common types of pests found in or around households and public/commercial premises are:

1) Cockroaches: American cockroach (Periplaneta americana), German cockroach (Blatella germanica), brown banded cockroach (Supella longipalpa), oriental cockroach (Blatta orientalis)
2) Mosquitos (cf. Vector control)
3) Ants: black house ant; odorous garden ant; fire ant/red imported fire ant; ghost ant; pharaoh Ant; white footed ant
4) Mites: dust mites, dirt mites,
5) Flies: filth flies or housefly and its relatives (Muscidae); flesh flies (Sarcophagidae); bottle flies and blowflies (Calliphoridae); black flies (Simuliidae); horseflies and deer flies (Tabanidae), fruit flies (Drosophilidae)
6) Stored Product Pests: primary coleopteran (beetles) pests include grain weevils (Sitophilus granarius, S. zeamais, S. oryzae), the lesser grain borer (Rhyzopertha dominica) and the saw-toothed grain beetle (Oryzaephilus surinamensis); secondary beetle pests include the flour beetles (Tribolium castaneum and T. confusum); the main lepidopteran pests (moths) are secondary; they feed regularly on processed foods so are more common in domestic kitchens and larders.
7) Occasional pests: silverfish, millipedes, psocids/booklice, clothes moths, plaster bagworms, phorid flies, dog ticks, flea, carpet beetle, black carpet beetle
8) Termites: *Odontotermes* spp., *Microcerotermes* spp., *Coptotermes* spp., *Heterotermes* spp., *Reticulitermes* spp., *Zootermopsis* spp., *Cryptotermes* spp., *Incisitermes* spp., *Marginitermes* spp. etc.

Another embodiment of the invention relates to a method to control pests with an insecticidal active ingredient-matrix material particle as described herein or an insecticidal composition as described herein.

Another embodiment of the invention relates to method to identify a useful matrix material for an insecticidal composition with Differential Scanning Calorimetry as follows:

a) an insecticidal active ingredient with a melting point of equal or above 110° C. and a water solubility of equal or below 0.1% and a matrix material to be tested are heated to a temperature of at least 20° C. (preferably at least 20° C. but no more than 50° C.) above the melting point of the at least one insecticidal active ingredient at a steady heating rate of preferably between 5° C. to 15° C. per minute and more preferably 10° C. per minute in a first heating cycle of the Differential Scanning Calorimetry, b) the maximal heating temperature of the first heating cycle is retained for a period of at least 10 minutes, preferably at least 15 minutes and more preferably at least 20 minutes, c) the temperature is then cooled down to a temperature of between 0° C. to 40° C. (preferably 15° C. to 35° C., more preferably to 20° C. to 30° C.), d) in a second heating cycle step, the temperature is raised to a temperature of at least 20° C. above the melting point of the at least one insecticidal active ingredient at a steady heating rate of preferably between 5° to 15° C. per minute and more preferably at 10° C. per minute, e) a useful matrix material is identified in case that the insecticidal active ingredient matrix material combination does not exhibit a melting peak when measured in the second heating cycle of the Differential Scanning Calorimetry.

Particularly preferred matrix materials are identified with DSC as indicated above when the first step a) is performed as follows:

Step a): an insecticidal active ingredient with a melting point of equal or above 110° C. and a water solubility of equal or below 0.1% and a matrix material to be tested (preferably with a softening point of at least 30° C. under the melting point of the insecticidal active ingredient) are heated to a temperature of (preferably at least 10° C. above the softening point of the matrix material and) at least 20° C. below the melting point of the at least one insecticidal active ingredient at a steady heating rate in a first heating cycle of the Differential Scanning Calorimetry. However, as indicated above, such a procedure might result in a false negative result when searching for a compatible matrix material. Therefore, it is then also needed to adapt step e) of the above indicated method preferably as follows:

Step e): a useful matrix material is identified in case that the insecticidal active ingredient matrix material combination does not exhibit a melting peak when measured in the second heating cycle of the Differential Scanning Calorimetry or, in case a melting peak of the insecticidal active ingredients is exhibited, the melting enthalpy of the insecticidal active ingredient as measured in a DSC (under the same heating conditions) alone is compared with the melting enthalpy of the insecticidal active ingredient observed during the second heating cycle of the insecticidal active ingredient matrix material combination in the DSC.

By comparing the differences of the melting enthalpies the fraction of the insecticidal active ingredient that is dissolved in the matrix material can be determined and therefore the suitability of the matrix can be assessed.

Another embodiment of the invention relates to a method to increase the contact efficacy of an insecticidal active ingredient with a melting point equal or above 110° C. and a water solubility of equal or below 0.1% with an insecticidal active ingredient-matrix material particle as described herein or an insecticidal composition as described herein in comparison to a conventional suspension concentrate formulation with the same insecticidal active ingredient.

A conventional suspension concentrate (SC) formulation refers to a dispersion in water. Such conventional SC formulations are known to be useful for active ingredients with a high melting point and insolubility in water. Conventional suspension concentrates are usually made by premixing the active ingredient powder in an aqueous solution of a wetting agent and a dispersing agent, followed by a wet grinding process in a bead mill to give a particle size distribution in the range of 1 to 10 microns. Then, other materials can be added such as e.g. a thickener in order to modify the rheological properties of the system to reduce the extend of particle separation and settling on storage. Typical wetting agents/dispersing agents used in conventional SC formulations are sodium lignosulphonates, sodium naphthalene sulphonate-formaldehyde condensates, aliphatic alcohol ethoxylates, tristryrylphenol ethoxylate phosphate esters, EO/PO block copolymers, graft copolymers. As an antifreezing agent urea, glycerol or propylene glycol is used. A conventional SC formulation comprises therefore an insecticidal active ingredient (5-60% by weight), a wetting agent and a dispersing agents (2.5-15% by weight), an antifreezing agent (4-13% by weight), other additives such as e.g. a thickener (0.2-2% by weight), and water (which in any case add up to 100% per weight of the total conventional SC formulation).

The present invention is illustrated in greater detail with reference to the examples which follow, but is not limited in any way to the use forms described in the examples.

EXAMPLES

1. Representative Physicochemical Parameters of Insecticidal Active Ingredients as Used According to the Invention

TABLE 1

| Insecticidal Active Ingredient | Melting point | water solubility at pH 7 |
|---|---|---|
| broflanilide | 155° C. | <0.01 mg/l |
| 4-[(5S)-5-(3,5-dichloro-4-fluorophenyl)-5-(trifluoromethyl)-4,5-dihydro-1,2-oxazol-3-yl]-N-[(4R)-2-ethyl-3-oxo-1,2-oxazolidin-4-yl]-2-methylbenzamide | 145° C. | <0.01 mg/l |
| 2-chloro-N-cyclopropyl-5-{1-[2,6-dichloro-4-(1,1,1,2,3,3,3-heptafluoropropan-2-yl)phenyl]-1H-pyrazol-4-yl}-N-methylnicotinamide | 173° C. | <0.01 mg/l |

The reported melting points as shown in table 1 were determined under normal conditions (1 atmosphere) with technical grade active ingredients by differential thermal analysis using a Mettler Toledo 822 or 823 DSC instrument. The sample was heated from 25° C. up to 300° C. at a heating rate of 3 K/min in a perforated aluminum crucible. The melting point is determined by first specifying a baseline for the temperature range to be evaluated. A tangent is then drawn at the turning point of the endothermic side of the peak and its intersection with the baseline is stated as the melting point of the investigated substance.

The reported water solubilities as shown in table 1 are determined as follows: Preparation of calibration standards: A 1000 ppm solution of the analyte in acetonitrile is prepared and from this at least three calibration points are obtained by dilution with acetonitrile going down to 0.01 mg/L, if needed. Sample Preparation: Two cavities of a deepwell are filled each with about 0.6 mg of homogenized sample and 500 μL of a pH 7 phosphate buffer is added. A glass pearl is added to each cavity, the deepwell is sealed and shaken for at least 24 h at 1600 rpm at 23° C. After the shaking procedure the solution is filtered. Aliquots of the filtrates are analysed via a HPLC-MS system with DAD and MS detection. The peak areas of all selected single DAD and ion traces are taken for the calculations. The calculation is done by external calibration against the areas of the standard samples (linear regression). The mean of all calculated values gives the water solubility of the active ingredient.

2. Determination of the Suitability of a Matrix Material for the Insecticidal Active Ingredient Under Investigation with Differential Scanning Calorimetry (DSC)

Using differential scanning Calorimetry (Mettler Toledo DSC 822e or 823 DSC) some mg of matrix material and the insecticidal active ingredient under investigation are entered into a tile and closed.

The weight ratio between matrix material and insecticidal active ingredient was as follows:

TABLE 2

| Samples: | Matrix material: | Insecticidal Active Ingredient: | Weight Ratio (Matrix Material/Insecticidal Active Ingredient): |
|---|---|---|---|
| Sample 1 | Novares CA 100 (Rutgers Group) | 2-chloro-N-cyclopropyl-5-{1-[2,6-dichloro-4-(1,1,1,2,3,3,3-heptafluoropropan-2-yl)phenyl]-1H-pyrazol-4-yl)-N-methylnicotinamide | 90:10 |

TABLE 2-continued

| Samples: | Matrix material: | Insecticidal Active Ingredient: | Weight Ratio (Matrix Material/Insecticidal Active Ingredient): |
|---|---|---|---|
| Sample 2 | Novares CA 100 (Rutgers Group) | Broflanilide | 95:5 |
| Sample 3 | Novares CA 100 (Rutgers Group) | 4-[(5S)-5-(3,5-dichloro-4-fluorophenyl)-5-(trifluoromethyl)-4,5-dihydro-1,2-oxazol-3-yl]-N-[(4R)-2-ethyl-3-oxo-1,2-oxazolidin-4-yl]-2-methylbenzamide | 90:10 |
| Sample 4 (control) | Licowax 371 FP (from Clariant) | 2-chloro-N-cyclopropyl-5-{1-[2,6-dichloro-4-(1,1,1,2,3,3,3-heptafluoropropan-2-yl)phenyl]-1H-pyrazol-4-yl}-N-methylnicotinamide | 90:10 |

As reference an empty closed tile was used. After equilibrating in the machine, both tiles are heated according to the following program:
  Heating from 25° C. to 130° C. at a heating rate of 10° C./min.
  Waiting for 20 min
  Cooling down to 25° C. at a cooling rate of 10° C./min
  Heating from 25° C. to 200° C. at a heating rate of 10° C./min
  Cooling down to 25° C. at a cooling rate of 10° C./min In case the weight ratio between the matrix material and insecticidal active ingredient is not optimal and e.g. too much insecticidal active ingredient is present which cannot be evenly distributed within the matrix material within the given time using the program above. The content of the insecticidal active ingredient can be decreased and the program can be run again or maximal heating temperature can be kept for a longer time period or alternatively, the following program can be applied.
  Heating from 25° C. to 200° C. at a heating rate of 10° C./min (the upper temperature can be varied, depending on the melting point of the insecticidal active ingredient to be investigated and should be 20° C. above this melting point)
  Waiting for 20 min
  Cooling down to 25° C. at a heating rate of 10° C./min
  Heating from 25° C. to 200° C. at a heating rate of 10° C./min (the upper temperature can be varied, depending on the melting point of the insecticidal active ingredient to be investigated and should be 20° C. above this melting point)
  Cooling down to 25° C. at a heating rate of 10° C./min Results: For samples 1 to 3 no melting peak of the insecticidal active ingredient during the second heating cycle has been identified in the DSC indicating that the matrix material is suitable for the insecticidal active ingredient investigated. For sample 4 a melting peak of the insecticidal active ingredient during the second heating cycle has been identified in the DSC indicating that the matrix material is not suitable for the insecticidal active ingredient investigated.

In analogy to the above described procedure and program other matrix material—insecticidal active ingredient combinations have been investigated with insecticidal active ingredients and matrix materials have been identified which did not show a melting peak of the insecticidal active ingredient during the second heating cycle in the DSC as follows:

Insecticidal Active Ingredient: 2-chloro-N-cyclopropyl-5-{1-[2,6-dichloro-4-(1,1,1,2,3,3,3-heptafluoropropan-2-yl)phenyl]-1H-pyrazol-4-yl}-N-methylnicotinamide in combination with one of following matrix materials: Novares Pure 85 AS (Rütgers Group), Novares C 100 (Rütgers Group), Novares TL 100 (Rütgers Group), Novares TK 100 (Rütgers Group), Novares TN 100 (Rütgers Group).

3. Preparation of Insecticidal Active Ingredient-Matrix Particles 40.0 gram of 2-chloro-N-cyclopropyl-5-{1-[2,6-dichloro-4-(1,1,1,2,3,3,3-heptafluoropropan-2-yl)phenyl]-1H-pyrazol-4-yl}-N-methylnicotinamide was added to 60.0 gram of Novares CA 100 (Rütgers Group). This mixture was stirred and heated to a temperature of 130° C. The temperature was kept while stirring until the active ingredient was evenly distributed. Subsequently the mixture was cooled down to room temperature.

The obtained matrix active ingredient composition was milled using a mixer with a cutting device (food processor Braun Küchenmaschine 3210).

In analogy to this method the same (or other) insecticidal active ingredient-matrix particles can be made (also with other concentrations).

4. Preparation of a Water-Dispersable Granule (WP) Formulation Based on the Insecticidal Active Ingredient-Matrix Particles as Prepared in Example 3.

For the preparation of a WP 10, 25 gram of the insecticidal active ingredient-matrix particles according to example 3 was added into mixer with a cutting device with 5% per weight of Oparyl MT 804 (Giovanni Bozzetto S.p.A.), 10% per weight of Baykanol SL (Lanxess) and 60% per weight of Kaolin Tec (Ziegler & Co. GmbH) and stirred. Subsequently this mixture was milled by air jet milling resulting in a WP containing 10% insecticidal active ingredient with the required physicochemical properties.

For the preparation of a WP 20, 50 gram of the insecticidal active ingredient-matrix particles according to example 3 was added into mixer with a cutting device with 5% per weight of Oparyl MT 804 (Giovanni Bozzetto S.p.A.), 10% per weight of Baykanol SL (Lanxess) and 35% per weight of Kaolin Tec (Ziegler & Co. GmbH) and stirred. Subsequently this mixture was milled by air jet milling resulting in a WP containing 20% per weight insecticidal active ingredient with the required physicochemical properties.

For the preparation of a WP 5, 50 gram of the insecticidal active ingredient-matrix particles according to example 3

(based on 10 gram Broflanilide with 90 gram Novaris CA 100 matrix material) was added into mixer with a cutting device with 2% per weight of Oparyl MT 804 (Giovanni Bozzetto S.p.A.), 5% per weight of Baykanol SL (Lanxess), 2% per weight of Ultrasil VN 3 (Evonik) and 38% per weight of Kaolin Tec (Ziegler & Co. GmbH) and stirred. Subsequently this mixture was milled by air jet milling resulting in a WP containing 5% per weight insecticidal active ingredient with the required physicochemical properties.

yl}-N-methylnicotinamide have been prepared as follows: The liquid ingredients as shown in table 3 were mixed and then solids were added and the mixture is then stirred until a homogeneous suspension is formed. The homogeneous suspension is subjected initially to coarse grinding and then to fine grinding, resulting in a suspension in which 90% of the solids particles have a particle size below 10 μm. Subsequently, Kelzan and water are added at room temperature with stirring. This gives a homogeneous suspension concentrate.

TABLE 3

| Ingredients | SC formulation with 2-chloro-N-cyclopropyl-5-{1-[2,6-dichloro-4-(1,1,1,2,3,3,3-heptafluoropropan-2-yl)phenyl]-1H-pyrazol-4-yl}-N-methylnicotinamide (in % by weight) | | SC formulation with Deltamethrin (in % by weight) |
|---|---|---|---|
| | Formulation: SC25 | Formulation: SC 100 | Formulation: SC 200 |
| 2-chloro-N-cyclopropyl-5-{1-[2,6-dichloro-4-(1,1,1,2,3,3,3-heptafluoropropan-2-yl)phenyl]-1H-pyrazol-4-yl}-N-methylnicotinamide | 2.5 | 10.0 | |
| Deltamethrin | | | 18.35 |
| Atlox 4913 (from Croda) | 3.0 | 3.0 | 4.5 |
| Soprophor TS 54 (from Solvay) | 5.0 | 5.0 | 1.5 |
| Synperonic PE/F 127 (from Croda) | 5.0 | 5.0 | |
| Glycerin | | | 10.0 |
| 1,2-propylene glycol | 10.0 | 10.0 | |
| Silcolapse 426 R (from Solvay) | 0.1 | 0.1 | 0.275 |
| Proxel ® GXL 20 (Lonza group) | 0.12 | 0.1 | 0.12 |
| Preventol ® D7 (from Lanxess) | | | 0.08 |
| Kelzan (CP Kelco) | 0.4 | 0.4 | 0.24 |
| Citric acid | | | 0.018 |
| Demineralized water | 73.88 | 66.4 | 64.917 |

5. Preparation of a Suspension Concentrate (SC) Formulation Based on the Insecticidal Active Ingredient-Matrix Particles as Prepared in Example 3.

For the preparation of a SC 100, 25 gram of the insecticidal active ingredient-matrix particles according to example 3 was mixed with 3.0 gram Atlox 4913 (Croda), 10 gram propylene glycol, 0.12 gram Proxel GXL 20 (Lonza), 0.1 gram Silcolapse 426 R (Solvay), 1 gram Synperonic PE/F 127 (Croda), and 1 gram Lucramul PS 16 (Levaco) and the mixture is then stirred until a homogeneous suspension is formed. The homogeneous suspension is subjected initially to coarse grinding and then to fine grinding, resulting in a suspension in which 90% of the solids particles have a particle size below 10 μm. Subsequently, 0.4 gram Kelzan (CP Kelco) and 59.38 gram of demineralized water were added at room temperature with stirring. This gives a homogeneous suspension concentrate.

6. Preparation of Conventional SC Formulations

In order to compare the characterisics of the formulations according to the invention with conventional formulations following conventional SC formulation have been prepared: SC formulation with Deltamethrin (SC200), SC formulation (SC25, SC100) with 2-chloro-N-cyclopropyl-5-{1-[2,6-dichloro-4-(1,1,1,2,3,3,3-heptafluoropropan-2-yl)phenyl]-1H-pyrazol-4-yl}-N-methylnicotinamide and an SC wax formulation (SC2.5%) with Deltamethrin.

SC formulation with Deltamethrin and the SC formulation with 2-chloro-N-cyclopropyl-5-{1-[2,6-dichloro-4-(1,1,1,2,3,3,3-heptafluoropropan-2-yl)phenyl]-1H-pyrazol-4-

The SC wax formulation (SC 2.5%) with Deltamethrin was prepared according to example 1 according to WO2016/001285A1.

7. Comparison of the Biological Contact Efficacy Against Cockroaches with Inventive WP and Conventional SC Formulations Diluted spray solution was prepared by dissolving a specific amount of formulation in tap water.

The WP 20 formulation as prepared according to example 4 containing 20 g active ingredient per 100 g formulation was used. 143 mg of the WP 20 formulation was dissolved in 50 ml tap water and transferred to a spray robot that is capable of spraying a volume of 35 ml evenly to an area of one square meter, which corresponds to 20 mg resp. 4 mg active ingredient/$m^2$ (abbreviated as a.i./$m^2$). For surface concentration of 4 mg active ingredient/$m^2$1:5 dilutions of the stock-solution was made. The surfaces were glazed tiles.

In addition, 0.3 ml of the conventional SC 100 formulation as prepared according to example 6 (100 g active ingredient per liter) were added to 49.7 ml of tap water. 35 ml of that solution was sprayed with a spray robot onto 1 square meter resulting in the deposit of 20 mg resp. 4 mg. active ingredient/$m^2$. For a surface concentration of 4 mg active ingredient/$m^2$ a 1:5 dilution of the stock-solution was made. The surfaces were glazed tiles.

Control: As a negative control 50 ml pure tap water were transferred to the spray robot. 35 ml of the tap water were sprayed to an area of 1 square meter. The surfaces sprayed were glazed tiles.

Then, adult Periplaneta americana (American cockroach) insects were placed onto the dried surface of the glazed tiles for 30 min after a 24 h drying period. Afterwards the test insect were removed from the surface and transferred to clean containers for further observation. Read-out times for insects were 24 hours, 48 hours and 72 hours after contact to the treated surface. Mortality in percent (%) was measured. In the examples, 100% mortality means that all test insects were dead, whereas 0% means that no mortality could be observed. The results are shown in table 4.

TABLE 4

Test insects: Periplaneta americana (American cockroach)

| Formulation | mg a.i./m$^2$ | Mortality [%] 24 h | 48 h | 72 h |
|---|---|---|---|---|
| WP 20 (example 4) | 20 | 100 | 100 | 100 |
|  | 4 | 20 | 100 | 100 |
| SC 100 (example 6) | 20 | 33 | 100 | 100 |
|  | 4 | 0 | 13 | 47 |
| Control |  | 0 | 0 | 0 |

8. Comparison of the Biological Contact Efficacy Against Bed Bugs with Inventive WP and Conventional SC Formulations A similar test as described in example 7 has been performed with Cimex lectularius (bed bugs) instead of American cockroaches and following formulations: A WP 20 as described in example 7.

In addition, 0.3 ml of the conventional SC 100 formulation as prepared according to example 6 (100 g active ingredient per liter) were added to 49.7 ml of tap water. 35 ml of that solution was sprayed with a spray robot onto 1 square meter resulting in the deposit of 20 mg resp. 4 mg active ingredient/m$^2$. For a surface concentration of 4 mg active ingredient/m$^2$ a 1:5 dilution of the stock-solution was made. The surfaces were glazed tiles.

The control was the same as in example 7. The results are shown in table 5.

TABLE 5

Test insects: Cimex lectularius (Bed Bugs)

| Formulation | mg a.i./m$^2$ | Mortality [%] 24 h | 48 h | 72 h |
|---|---|---|---|---|
| WP 20 (example 4) | 20 | 0 | 60 | 93 |
|  | 4 | 0 | 7 | 73 |
| SC 100 (example 6) | 20 | 0 | 0 | 0 |
|  | 4 | 0 | 0 | 0 |
| Control |  | 0 | 0 | 0 |

9. Comparison of the Biological Contact Efficacy Against Mosquitos with Inventive WP and Conventional SC Formulations A similar test as described in example 7 has been performed with Anopheles funestus (Malaria mosquito) instead of American cockroaches. Read-out times for insects were 24 hours after contact to the treated surface. Following formulations have been used:

A WP 20 as described in example 7.
A WP 10 formulation containing as prepared in example 4 with 10 g active ingredient per 100 g formulation was used. 285 mg of the WP 10 formulation was dissolved in 50 ml tap water and transferred to a spray robot that is capable of spraying a volume of 35 ml evenly to an area of one square meter, which corresponds to 20 mg resp. 4 mg active ingredient/m$^2$. For surface a concentration of 4 mg active ingredient/m$^2$ a 1:5 dilution of the stock-solution was made. The surfaces were glazed tiles.

In addition, 1.15 ml of the conventional SC 25 formulation as prepared according to example 6 (25 g active ingredient per liter) were added to 48.85 ml of tap water. 35 ml of that solution was sprayed with a spray robot onto 1 square meter resulting in the deposit of 20 mg resp. 4 mg active ingredient/m$^2$. For a surface concentration of 4 mg active ingredient/m$^2$ a 1:5 dilution of the stock-solution was made. The surfaces were glazed tiles.

The control was the same as in example 7. The results are shown in table 6.

TABLE 6

Test insects: Anopheles funestus (Malaria mosquito)

| Formulation | mg a.i./m$^2$ | Mortality [%] 24 h |
|---|---|---|
| WP 20 (example 4) | 20 | 100 |
|  | 4 | 100 |
| WP 10 (example 4) | 20 | 100 |
|  | 4 | 100 |
| SC 25 (example 6) | 20 | 25 |
|  | 4 | 25 |
| Control |  | 0 |

10. Comparison of the Biological Contact Efficacy Against Mosquitos with Inventive WP and Inventive SC Formulations A similar test as described in example 9 has been performed with Anopheles funestus (Malaria mosquito). However, the formulations have been sprayed on glaze tiles via a glass nozzle and compressed air pressure of 0.2 bar. The spray radius was adjusted in a way that 1 ml completely covers the test surface, which corresponds to 20 mg active ingredient/m$^2$. For a surface concentration of 4 mg active ingredient/m$^2$ or 0.8 mg active ingredient/m$^2$ a 1:5 resp. a 1:10 dilution of the stock-solution has been made.

Following formulations have been used:
WP10 as described in example 9 resp. in example 4.
A SC 100 as described in example 7 resp. in example 5.
The control was the same as in example 7.
The results are shown in table 7.

TABLE 7

Test insects: Anopheles funestus (Malaria mosquito)

| Formulation | mg a.i./m$^2$ | Mortality [%] 24 h |
|---|---|---|
| WP 10 (examples 9 and 4) | 4 | 100 |
|  | 0.8 | 100 |
| SC100 (examples 7 and 5) | 4 | 100 |
|  | 0.8 | 80 |
| Control |  | 0 |

In summary examples 7 to 9 show the improved contact biological efficacy of the formulations according to the invention in comparison to conventional formulations with the same active ingredient.

11. Long Term Efficacy Against Mosquitos with Inventive WP Formulations

Glazed tiles and unglazed tiles have been treated with the WP 10 and WP 20 formulations as described in example 9 and a WP 5 based on Broflanilide as described in Example 4 and then stored at ambient conditions. An additional set of treated tiles were stored in a climate chamber with conditions of 27° C. and 80% air humidity. In monthly contact bioassays it has been shown, that the insecticidal effect of the treated surface remains stable after a period of 28 weeks regardless of the storage conditions. The contact bioassays have been conducted as outlined in example 9.

The results are shown in table 8 (The control was the same as in example 7).

TABLE 8

Test insects: Anopheles funestus (Malaria mosquito) 28 weeks after spray treatment

| Formulation | mg a.i./m² | Mortality [%] 24 h |
|---|---|---|
| WP 20 (examples 9 and 4) | 20 | 100 |
|  | 4 | 100 |
| WP 10 (examples 9 and 4) | 20 | 100 |
|  | 4 | 100 |
| WP 5 (example 4) | 20 | 100 |
|  | 4 | 100 |
| Control |  | 0 |

12. Long Term Efficacy Against Mosquitos with Inventive WP Formulations

Glazed tiles have been treated with the WP 10 formulations as described in example 9 based on 4-[(5S)-5-(3,5-dichloro-4-fluorophenyl)-5-(trifluoromethyl)-4,5-dihydro-1,2-oxazol-3-yl]-N-[(4R)-2-ethyl-3-oxo-1,2-oxazolidin-4-yl]-2-methylbenzamide as described in Example 4 and then stored at ambient conditions. In contact bioassays it has been shown, that the insecticidal effect of the treated surface remains stable after a period of 8 weeks. The contact bioassays have been conducted as outlined in example 9.

The results are shown in table 9 (as control the active ingredient was dissolved in acetone and sprayed on the tile forming crystalline residues as can be seen for SC).

TABLE 9

Test insects:

| Formulation | mg a.i./m² | Mortality [%] Aedes Aegypti 24 h | Mortality [%] Culex quinque fasciatus 24 h | Mortality [%] Anopheles funestus 24 h |
|---|---|---|---|---|
| WP 10 | 20 | 100 | 100 | 100 |
| 1 day | 4 | 100 | 95 | 100 |
| (examples 9 and 4) | 0.8 | 85 | 80 | 60 |
| WP 10 | 20 | 100 | 100 | 100 |
| 1 month | 4 | 100 | 100 | 100 |
| (examples 9 and 4) | 0.8 | 95 | 100 | 70 |
| WP 10 | 20 | 100 | 100 | 100 |
| 8 week | 4 | 100 | 100 | 100 |
| (examples 9 and 4) | 0.8 | 95 | 85 | 95 |
| Reference crystalline | 20 | 100 | 100 | 90 |
| spray 1 day | 4 | 89 | 88 | 30 |
| (examples 9 and 4) | 0.8 | 0 | 25 | 0 |
| Control |  | 0 | 0 | 0 |

13. Biological Performance of Known SC Formulations with Deltamethrin and "Controlled Release" Formulations with Deltamethrin in Contact Bioassay Against Mosquitos.

Similarly as outlined in example 9 a contact bioassay was conducted with the "controlled release" Deltamethrin SC 2.5 wax formulation and the conventional SC 200 formulation both prepared as described in example 6. The results are shown in table 10 (The control was the same as in example 7).

TABLE 10

Test insects: Anopheles funestus (Malaria mosquito)

| Formulation | mg a.i./m² | Mortality [%] 24 h |
|---|---|---|
| Deltamethrin SC 2.5 (example 6) | 4 | 75 |
| Deltamethrin SC 200 (example 6) | 4 | 85 |

The results in table 10 show that "controlled release" formulations—in general—are not suitable to achieve optimal results in regard to contact and initial biological efficacy.

The invention claimed is:

1. Insecticidal active ingredient-matrix material particles with a particle size d50 of 0.1 to 75 microns comprising
   a) at least one insecticidal active ingredient selected from the group consisting of isoxazolines, meta-diamides, arylpyrazolheteroarylamides and arylpyrazolarylamides, wherein the insecticidal active ingredient has a melting point of equal to or above 110° C. and a water solubility of equal to or below 0.1%, and wherein the at least one insecticidal active ingredient is distributed in
   b) a matrix material comprising polymerized monomer units selected from the group consisting of C7 to C12 unsaturated aromatic hydrocarbons, wherein at least one of the polymerized monomer units is selected from the group consisting of indene, methyl indene, vinyltoluene, and dicyclopentadiene, wherein the matrix material has a softening point that is at least 30° C. under the melting point of the insecticidal active ingredient, and wherein the insecticidal active ingredient-matrix material particle does not exhibit a melting peak of the active ingredient when measured in a second heating cycle after heating to a temperature of at least 20° C. above the melting point of the insecticidal active ingredient at a steady heating rate using Differential Scanning Calorimetry.

2. Insecticidal active ingredient-matrix material particles of claim 1, wherein the insecticidal active ingredient-matrix material particles do not exhibit a melting peak of the active ingredient when measured in the second heating cycle after heating to a temperature of at least 20° C. above the melting point of the at least one insecticidal active ingredient at a steady heating rate in a first heating cycle using Differential Scanning Calorimetry.

3. The insecticidal active ingredient-matrix material particles according to claim 2, wherein the maximal heating temperature of the first heating cycle is retained for a period of at least 10 minutes.

4. The insecticidal active ingredient-matrix material particles according to claim 2, wherein the at least one insecticidal active ingredient and the matrix material are cooled down to a temperature of between 0° C. to 40° C. between the first and second heating cycle at a steady cooling rate.

5. The insecticidal active ingredient-matrix material particles according to claim 1, wherein the weight ratio between the at least one insecticidal active ingredient and the matrix material is from 1:99 to 1:1.

6. The insecticidal active ingredient-matrix material particles according to claim 1, wherein the at least one insecticidal active ingredient is selected from the group consisting of 2-chloro-N-cyclopropyl-5-{1-[2,6-dichloro-4-(1,1,1,2,3,3,3-heptafluoropropan-2-yl)phenyl]-1H-pyrazol-4-yl}-N-methylnicotinamide, Broflanilide and 4-[(5S)-5-(3,5-dichloro-4-fluorophenyl)-5-(trifluoromethyl)-4,5-dihydro-1,2-oxazol-3-yl]-N-[(4R)-2-ethyl-3-oxo-1,2-oxazolidin-4-yl]-2-methylbenzamide.

7. The insecticidal active ingredient-matrix material particles according to claim 1, wherein the molecular weight of the matrix material is between 1 to 1000 kDa.

8. An insecticidal composition, wherein the insecticidal composition comprises
   a) insecticidal active ingredient-matrix material particles according to claim 1,
   b) one or more surfactant(s),
   c) optionally further adjuvants selected from the group of anti-freeze agents, anti-foam agents, preservatives, anti-oxidants, thickeners, colorants and binders, and
   d) a liquid phase and/or fillers.

9. The insecticidal composition according to claim 8, wherein the insecticidal composition comprises
   a) from 1 to 70% by weight of insecticidal active ingredient-matrix material particles of claim 1,
   b) from 1 to 25% of one or more surfactant(s),
   c) from 0 to 25% by weight of adjuvants selected from the group of anti-freeze agents, anti-foam agents, preservatives, anti-oxidants, thickeners, colourants and binders,
   d) liquid phase and/or fillers which in any case add up to 100% per weight of the total insecticidal composition.

10. The insecticidal composition according to claim 9, wherein the insecticidal composition is in the form of a suspension concentrate (SC), water-dispersable granule (WG) or wettable powder (WP) or a spray solution thereof.

11. A method for controlling pests, comprising applying to a surface the insecticidal active ingredient-matrix material particles according to claim 1.

12. A method to identify a useful matrix material for insecticidal active ingredient-matrix material particles of claim 1 with Differential Scanning Calorimetry comprising:
   a) heating at least one insecticidal active ingredient selected from the group consisting of isoxazolines, meta-diamides, arylpyrazolheteroarylamides and arylpyrazolarylamides and a matrix material to be tested to a temperature of at least 20° C. above the melting point of the at least one insecticidal active ingredient at a steady heating rate in a first heating cycle of the Differential Scanning Calorimetry,
   b) retaining the maximal heating temperature of the first heating cycle for a period of at least 10 minutes,
   c) cooling the temperature down to a temperature of between 0° C. to 40° C.,
   d) in a second heating cycle step, raising the temperature to a temperature of at least 20° C. above the melting point of the at least one insecticidal active ingredient at a steady heating rate, and
   e) identifying a useful matrix material in the case that the insecticidal active ingredient matrix material combination does not exhibit a melting peak when measured in the second heating cycle of the Differential Scanning Calorimetry.

13. A method for controlling pests, comprising applying to a surface an insecticidal composition according to claim 8.

14. The insecticidal active ingredient-matrix material particles according to claim 1, wherein the polymerized monomer units are selected from the group consisting of indene, methyl indene, or a combination thereof.

15. The insecticidal active ingredient-matrix material particles according to claim 1, wherein the particle size d50 is between 0.5 and 50 microns.

16. The insecticidal active ingredient-matrix material particles according to claim 1, wherein the particle size d50 is between 1 and 25 microns.

17. The method of claim 11, wherein the insecticidal active ingredient-matrix material particles are applied by spraying.

18. The method of claim 13, wherein the insecticidal composition is applied by spraying.

19. The method of claim 18, wherein the insecticidal composition is diluted with water.

20. The insecticidal active ingredient-matrix material particles according to claim 1, wherein at least one of the polymerized monomer units is indene.

21. The insecticidal active ingredient-matrix material particles according to claim 1, wherein the matrix material comprises phenol modified indene.

* * * * *